United States Patent
Zhang

(10) Patent No.: US 8,758,468 B2
(45) Date of Patent: Jun. 24, 2014

(54) EXPANDABLE CAGE FOR BAGHOUSE FILTER

(75) Inventor: Tian Xuan Zhang, Overland Park, KS (US)

(73) Assignee: BHA Altair, LLC, Franklin, TN (US)

( * ) Notice: Subject to any disclaimer, the term of this patent is extended or adjusted under 35 U.S.C. 154(b) by 103 days.

(21) Appl. No.: 13/433,405

(22) Filed: Mar. 29, 2012

(65) Prior Publication Data

US 2013/0255204 A1 Oct. 3, 2013

(51) Int. Cl.
*B01D 46/02* (2006.01)

(52) U.S. Cl.
USPC .............................................. 55/379; 55/492

(58) Field of Classification Search
USPC ............. 55/341.1–341.7, 361–382, 490–519; 95/273–287
See application file for complete search history.

(56) References Cited

U.S. PATENT DOCUMENTS

| 6,214,072 | B1 * | 4/2001 | Kappeler et al. ................ 55/379 |
| 2005/0160707 | A1 * | 7/2005 | Dries ............................. 55/418 |
| 2009/0005633 | A9 | 1/2009 | Montpetit et al. |
| 2011/0067370 | A1 | 3/2011 | Schumann et al. |
| 2012/0279185 | A1 * | 11/2012 | Appelo ........................... 55/378 |

FOREIGN PATENT DOCUMENTS

| CN | 202113718 U | 1/2012 |
| WO | WO 00/72942 A1 | 12/2000 |

* cited by examiner

*Primary Examiner* — Duane Smith
*Assistant Examiner* — Thomas McKenzie
(74) *Attorney, Agent, or Firm* — Reinhart Boerner Van Deuren P.C.

(57) ABSTRACT

A filter for use in a baghouse. The filter is to be supported by a tubesheet that separates dirty fluid and clean fluid chambers of the baghouse. The filter including a filtration bag that has an open end adjacent to the tubesheet and an encircling sidewall that extends from the open end to a distal end along a direction of a central axis of the filtration bag. The bag sidewall permits passage of fluid there through so that the fluid may pass from the dirty fluid chamber to the clean fluid chamber and blocks passage of at least some particulate material against proceeding to the clean fluid chamber. The filter includes a cage located within the filtration bag. The cage has structure to permit expansion of the cage to increase a cage diameter that forces the bag sidewall taut against the cage.

18 Claims, 3 Drawing Sheets

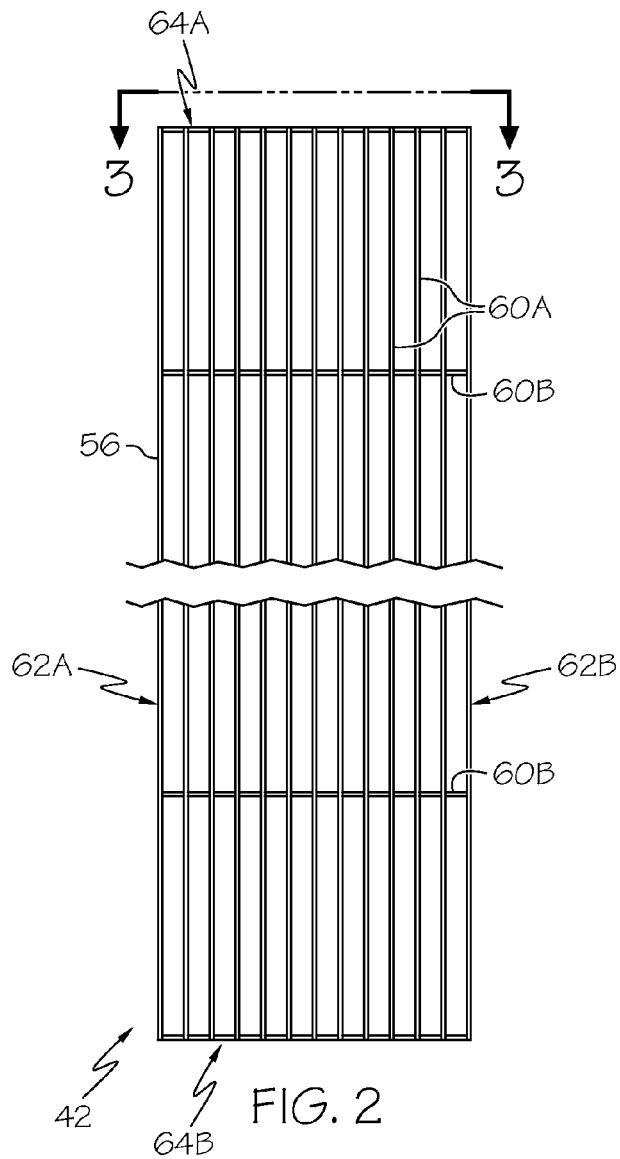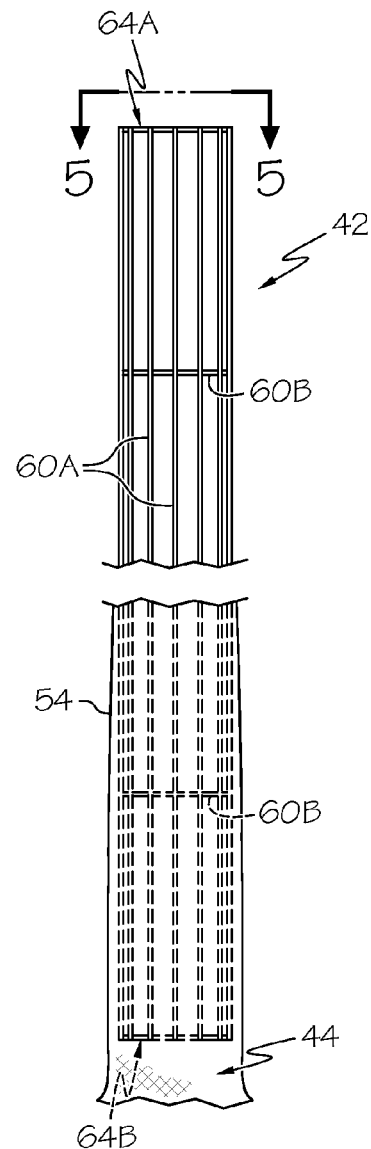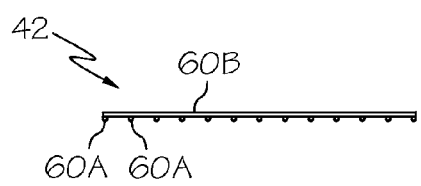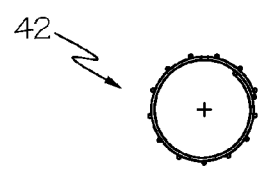

EXPANDABLE CAGE FOR BAGHOUSE FILTER

BACKGROUND OF THE INVENTION

1. Field of the Invention

The present invention relates generally to fluid (e.g., air) filters, and more particularly, to bag fluid filters that can be utilized with a baghouse environment.

2. Discussion of the Prior Art

Fluid filters are known and used in many different applications, including baghouses. Each baghouse may be provided with one or more fluid filters for filtering dirty fluid (e.g., air) in various functions such as fuel-based power generation, chemical/cement/mineral processing, incineration, etc. Current technology filters include filter cartridges, which have filtration media and associated structures provided and replaced as a unit, and replaceable "bag" media which envelope cages that need not be replaced as often as the bag-type media.

Focusing upon bag-type media, the underlying cages are generally elongate and have a cylindrical shape. The filtration bag generally has a shape that corresponds to the shape of the cage enveloped by the filtration bag. It is to be appreciated that replacement of the filter media onto a cage involves an insertion movement of the cage into the bag, with the bag being a receptacle for the cage. The dimensions of the cage relative to the bag are such that the cage can be inserted into the filtration bag without binding of the bag and also such that the filtration bag is not damaged (e.g., torn, punctured, or otherwise stressed). As such, there is some amount of space or looseness of the filtration bag relative to the cage. In other words, the filtration bag is not form-fitting to the cage to allow the insertion to occur.

In view of the looseness of the bag, it is possible that some bag movement relative to the cage can occur during operation. For example, during filtration flow, the filtration bag may be forced against the cage because of a flow. However, during a pulse cleaning cycle, the filtration bag may move away from the cage. Movement of the filtration bag may cause stresses, wear or the like. It may be beneficial to reduce or eliminate some filtration bag movement to help avoid stress, wear, etc.

Such stress, wear, etc. can be more of an issue for certain types of bags. For example, some types of bags include glass fibers. One specific example type of glass-containing bags are bags that include woven glass fibers. Often the woven glass fibers may include fibers extending vertically and fibers extending horizontally. The glass fibers can and do break if bent/flexed beyond a tolerance level during bag movement. The above-mentioned bag movement can thus cause breakage of the glass fibers. Such fiber breakage may be especially prevalent at folds, pleats, creases or the like. Fibers that extend transversely to such folds, pleats, creases or the like may have a heightened amount of bending/flexing at the folds, pleats, creases or the like and thus may have a heightened propensity to break. As such, the bag may develop damage or wear "patterns" at the folds, pleats, creases or the like. For very long bags, the folds, pleats, creases tend to extend along the elongation of the bag. So, if the bag is vertically oriented, the folds, pleats, creases or the like would similarly be vertically extending. Therefore, the damage or wear "patterns" may extend along the relatively long extent of the bag and thus can become significant.

Accordingly, it may be beneficial to reduce or eliminate some filtration bag movement to help avoid stress, wear, etc.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a filter for use in a baghouse for filtering at least some particulate material from fluid. The filter is to be supported by a tubesheet that separates dirty fluid and clean fluid chambers of the baghouse. The filter including a filtration bag that has an open end adjacent to the tubesheet and an encircling sidewall that extends from the open end to a distal end along a direction of a central axis of the filtration bag. The bag sidewall permits passage of fluid there through so that the fluid may pass from the dirty fluid chamber to the clean fluid chamber and blocks passage of at least some particulate material against proceeding to the clean fluid chamber. The filter includes a cage located within the filtration bag. The cage has structure to permit expansion of the cage to increase a cage diameter that forces the bag sidewall taut against the cage.

In accordance with another aspect, the present invention provides a baghouse filter assembly for filtering at least some particulate material from fluid. The arrangement includes a housing that has a dirty fluid chamber and a clean fluid chamber separated by a tubesheet. The tubesheet has at least one aperture there through. The filter includes a filter supported by the tubesheet. The filter includes a filtration bag that has an open end adjacent to the tubesheet and an encircling sidewall that extends from the open end to a distal end along a direction of a central axis of the filtration bag. The bag sidewall permits passage of fluid there through so that the fluid may pass from the dirty fluid chamber to the clean fluid chamber and blocks passage of at least some particulate material against proceeding to the clean fluid chamber. The filter includes a cage located within the filtration bag. The cage has structure to permit expansion of the cage to increase a cage diameter that forces the bag sidewall taut against the cage.

BRIEF DESCRIPTION OF THE DRAWINGS

The foregoing and other aspects of the present invention will become apparent to those skilled in the art to which the present invention relates upon reading the following description with reference to the accompanying drawings, in which:

FIG. 2 is a schematic representation of a one example cage usable within the baghouse of FIG. 1 in a flat, pre-rolled condition in accordance, with at least one aspect of the present invention;

FIG. 3 is a view along line 3-3 within FIG. 2 of the example cage in the flat, pre-rolled condition;

FIG. 4 is a schematic representation of the example cage of FIG. 2 in a rolled, generally cylindrical shape of sufficiently small diameter to allow relative ease of insertion of the cage into a filtration bag during filter assembly;

FIG. 5 is a view along line 5-5 within FIG. 4 showing the generally circular end of the generally cylindrical shaped cage;

DETAILED DESCRIPTION OF THE INVENTION

Figure 1:
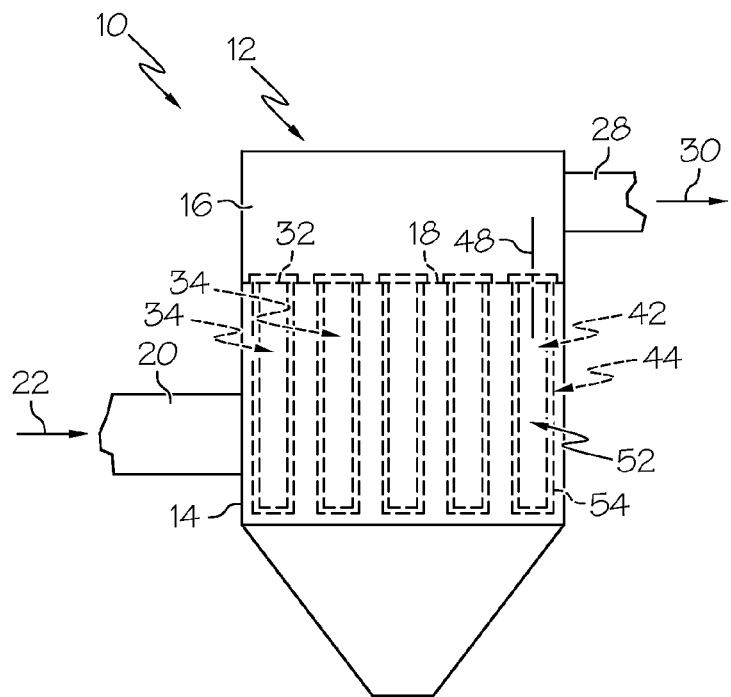
FIG. 1 is a schematic illustration of an example baghouse having a plurality of filters with expandable cages in accordance with at least one aspect of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

FIG. 1 schematically shows an example of a baghouse 10 as an environment within which the present invention may be utilized. The baghouse 10 may be defined by an enclosed housing 12 and can be divided into two sections, a dirty fluid plenum 14 and a clean fluid plenum 16. The dirty fluid plenum 14 and the clean fluid plenum 16 are examples of dirty and clean fluid chambers, respectively. The dirty fluid plenum 14 and the clean fluid plenum 16 may be placed in fluid communication with each other and separated by a tubesheet 18, which is a wall, a divider, or the like. The dirty fluid plenum 14 is in fluid communication with a dirty fluid inlet port 20 allowing unfiltered fluid 22 (e.g., air, schematically represented by flow arrowhead) to enter the baghouse 10. The clean fluid plenum 16 is in fluid communication with a clean fluid outlet port 28 allowing filtered fluid 30 (e.g., air, schematically represented by flow arrowhead) to exit the baghouse 10. The dirty fluid plenum 14 and the clean fluid plenum 16 may be arranged in fluid communication via one or more circular apertures 32 formed in the tubesheet 18. Each aperture 32 may be sized to accept/hold or otherwise is associated with a filter 34 (shown in phantom within FIG. 1 to indicate that the filters are within the housing 12). Other than passage of fluid flow through the apertures 32, the tubesheet 18 prevents the passage of fluid. As such, fluid may pass from the dirty fluid plenum 14 to the clean fluid plenum 16 via the filters 34 and the associated apertures 32. It is to be appreciated that the baghouse 10 may be varied and the presented example is not to be taken as a limitation upon the present invention.

In the shown example of FIG. 1, five filters 34 are shown. However, the baghouse may include any number (i.e., one or more) of filters 34. The filters 34 are generally elongate may be arranged parallel (e.g., axes of elongation are parallel) to each other in a substantially vertical manner. It is to be appreciated that the filters 34 are only schematically shown in FIG. 1 and that the Figure and the contents thereof are sized for easy of illustration. Actually, embodiments may have various filter lengths (e.g., 12-20 ft., and typically 16-18 ft.)

The filters 34 are capable of filtering fluid (e.g., air) to remove a variety of dry particulate matter. For example, the filters 34 may be used, but are not so limited, to filter hot gas(es) resulting from fuel combustion associated with electrical energy generation. In other examples, the filters 34 may be used in other applications such as chemical/cement/mineral processing, incineration, etc.

The schematically shown filters 34 may have varied structures/configurations. However, the filters have the following aspects. For each filter 34, the filter includes an elongate cage 42 and an elongate filtration bag 44. For the discussion herein, a single filter 34 is discussed with the understanding that the discussion may be equally applicable to the other filters.

The cage 42 is supported by the tubesheet 18. In the shown example, the cage 42 hangs from the tubesheet 18 into the dirty fluid plenum 14. The cage 42 may be made of a number of different materials such as metal (e.g., steel, stainless steel, or the like), and may be sufficiently stiff to provide support to the elongate filtration bag 44. The cage 42 has a general elongate cylindrical shape. The elongation is along a central axis 48. The cage 42 is hollow and thus bounds an interior volume 52, which is open to the clean fluid plenum 16 via the associated aperture 32 in the tubesheet 18. As such, the interior volume 52 defines an elongated central passageway within the filter 34 to the clean fluid plenum 16. The cage 42 includes openings to allow for the passage of fluid through the cage into the interior volume 52. For instance, the cage 42 may include a plurality of perforations, apertures, holes, mesh, etc. to allow fluid passage.

The filtration bag 44 is made of material to provide a desired filtering function and capture/block progress of particulate that is proceeding with the unfiltered fluid 22 entering the dirty fluid plenum 14. It is to be appreciated that the material of the filtration bag 44 may be varied and may be chosen based upon the specific of the particulate that is being filtered from the fluid. As such, specifics of the material for the filtration bag 44 need not be specific limitations upon the present invention.

The filtration bag 44 is arranged as a bag shape or tube to envelope the cage 42. The filtration bag 44 has an opening (i.e., an open end) at an upper end that surrounds the cage 42 adjacent to the location of the cage engagement/connection to the plenum sheet. Although it is not shown with the schematic drawing of FIG. 1, the filtration bag 44 is secured to the cage/plenum sheet adjacent to the open end of the filtration bag (i.e., adjacent to the cage/plenum engagement/connection). The securing may be via a retaining bracket or the like. The filtration bag 44 has an encircling sidewall 54 extending from the open end to a distal end along a direction of the axis 48 of the filtration bag 44. The bag sidewall 54 permits passage of fluid there through so that the fluid may pass from the dirty fluid plenum 14 to the clean fluid plenum 16 while blocking passage of at least some particulate material against proceeding to the clean fluid plenum. The cage 42 retains the encircling sidewall 54 of the filtration bag 44 spaced from the central axis 48.

It is to be appreciated that the filtration bag 44 may be removed from the cage 42. Such removal may permit replacement or other functions (e.g., maintenance). Installation of the filtration bag 44 onto the cage 42 entails relatively inserting the cage into the open end of the filtration bag, and pulling the bag up (as viewed in the Figures) relative to the cage. It is to be appreciated that at least some amount of slack or looseness exists between the filtration bag 44 and the cage 42 during installation. Another way of saying this is that the filtration bag 44 does not form-fit or press-fit against the cage 42 during the installation of the filtration bag onto the cage. Such looseness can help to provide ease of bag installation (e.g., the filtration bag does not bind during installation). In addition, such looseness can help avoid snagging, tearing, puncturing, or otherwise stressing of the filtration bag 44 during installation.

Although looseness of the filtration bag 44 may have some benefits, especially during installation, filtration bag looseness may have some detriments. For example, bag looseness may allow movement of the filtration bag 44 during operation of the baghouse 10. As one specific example, it is to be expected that during flow for filtration, the filtration bag 44 will be pressed against the cage 42. This is due to the flow and the pressure differential between the outside and inside of the filtration bag 44. However, during a reverse-flow pulse for cleaning (i.e., dislodging accumulated particulate), the filtration bag 44 may move away from the cage 42. In addition, it is even possible that looseness of a filtration bag 44 could allow the filtration bag 44 to move (e.g., vibrate or ripple) during the filtering process.

Possibly dependent upon the amount of movement, the movement may be associated with the introduction of stresses, wear or the like to the filtration bag 44. It may be beneficial to reduce or eliminate some filtration bag movement to help avoid stress, wear, etc. In the past, efforts to eliminate bag looseness and thus efforts to reduce stresses, wear or the like included an approach of manufacturing/configuring the filtration bag to have a reduced cross-sectional diameter of the bag based upon the diameter of the associated cage. In other words, the prior approach was to make/configure the bag diameter only large enough to fit over the outer diameter of the cage. It is to be appreciated that the manufacturing/configuring the filtration bag to have a relatively reduced cross-sectional diameter is a pre-installation approach. However, pre-installation bag diameter relative reduction was coupled to increases in bag installation difficulty, propensity for bag damage during installation, and the like.

In accordance with an aspect of the present invention, at least some filtration bag movement is reduced or eliminated by reducing or eliminating looseness (e.g., slack) in the filtration bag 44 subsequent to installation of the filtration bag onto the cage 42. In particular, the cage has structure to permit expansion of the cage 42 to increase a cage cylindrical diameter that forces the bag taut against the cage 42. The increase of cylindrical diameter of the cage 42 post-insertion into the bag 44 can be accomplished with varied structural constructions of the cage 42. It is intended that the scope of the present invention includes such varied structural constructions of the cage 42. For the sake of discussion, a first example embodiment is shown within FIGS. 2-7. Specifically, the example is a cage 42 made of resilient material which is initially flat or sheet like and which is rolled into a generally cylinder shape. The resilience of the material allows the cylinder diameter to be increased after the cage 42 is inserted into the bag 44 to cause the bag to be taut against the cage.

With reference to FIG. 2, the flat, pre-rolled condition of the cage 42 is schematically shown. For ease of reference, although the cage is shown in a flat, pre-rolled condition, the term "cage" and the reference numeral "42" are utilized. In addition, it is to be appreciated that some structures (e.g., mounting structures) of the cage may be omitted from the Figures in order to focus upon the inventive aspects. It is to be appreciated that such additional structures can be present without departing from the scope of the present invention.

Within the shown example, a wall 56 of the cage 42 is made of a plurality of metal wire bars 60. The example has a first group 60A of wire bars extending in a direction that will be parallel to the central axis 48 (see FIG. 1) of the filter 34. It is to be appreciated that the number of wire bars 60A in the first group is not a limitation upon the present invention. Upon viewing FIG. 2, it is easily appreciated that two wall end portions 62A, 62B (left and right as viewed within FIG. 2) are present and terminate at the last wires of the first wire group 60A.

A second group 60B of metal wire bars extends transverse to the first group 60A of wire bars. At the intersections between wire bars of the two groups 60A, 60B the bars are joined, such as by welding. Here also, the number of wire bars 60B within the example is not a limitation upon the present invention. Top and bottom end portions 64A, 64B, as viewed within FIG. 2, are easily appreciated and these end portions can correspond to upper and lower portion of the ultimate cage cylindrical configuration. It is to be appreciated that other cage structures, such as mounting lips, flanges etc. can also be present. The constructions/configurations of such other structures can be varied greatly and thus are not presented herein.

Figure 6:
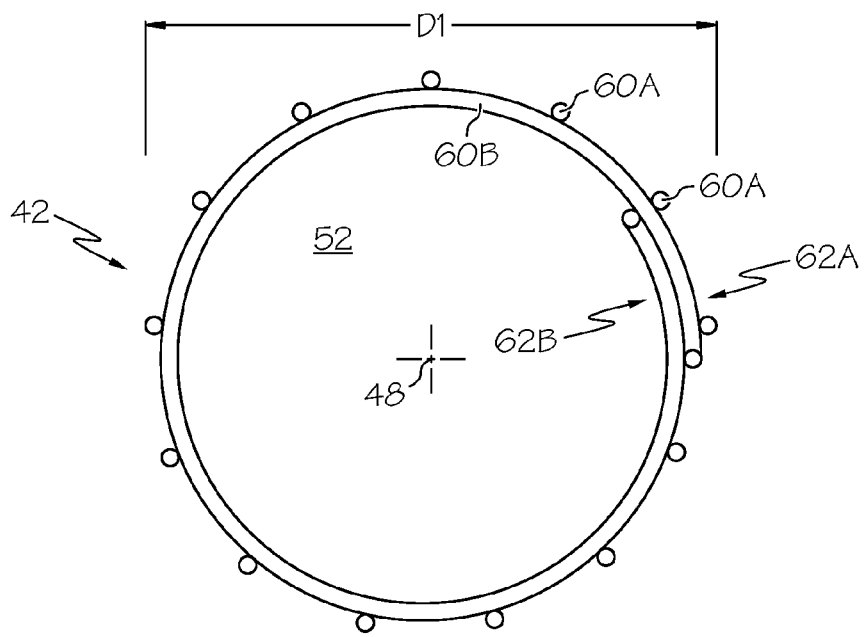
FIG. 6 is an enlarged view of the cage shown in FIG. 5, and shows the side wall of the cage extending in a helix with one portion located radially inward of another portion and with a diameter indication to allow relative ease of insertion of the cage into a bag during filter assembly as indicated in FIG. 4.

Focusing upon the second group of wire bars 60B, it is to be appreciated that at least the wire bars within this group are resilient. Specifically, the wire bars 60B can be deformed from an initial generally flat/straight orientation to have a curved, arc shape during rolling of the cage into the generally cylinder shape as shown in FIGS. 4-6. Moreover, the arc shape may be an arc that extends more for than one complete circle turn (e.g., an arc angle greater than 360°). Still further, the resilience of wire bars 60B is such that the wire bars can be formed into generally circular shape that has a first diameter and then formed into a relatively larger generally circular shape that has a second, relatively larger diameter.

Turning now to FIG. 4, it is should be appreciated that initially flat sheet-like member of FIG. 2 has been rolled into the generally cylinder shape. Within the shown example, the shape is a general cylinder shape because the two end portions 62A, 62B (e.g., left and right of the flat form shown within FIG. 2) radially overlap within the rolled form (note the curved, slight helix spiral of the wire bars of the second group 60B). See FIG. 5 and FIG. 6 (which is an enlargement of FIG. 5). Thus, the radial distance from the central axis 48 to the arced, generally circular wire bars 60B does vary. As such, a perfect cylinder is not provided. Although the radius does vary slightly due to the overlay, it would be efficient to consider the shown rolled state of the cage 42 as providing a general cylindrical shape having a first diameter D1, which is shown in FIG. 6.

Returning to FIG. 4, it is to be appreciated that the first, rolled diameter D1 is sufficiently small so as to allow ease of insertion of the cage 42 into the filtration bag 44. Such insertion of the cage 42 into the bag 44 may be an initial installation of the bag into the cage or a replacement installation. Installation of the filtration bag 44 onto the cage 42 entails relatively inserting the cage into the open end of the filtration bag 44, and pulling the bag up (as viewed in the FIG. 4, which shows the bag 44 only partially up the cage 42) relative to the cage 42. It is desirable that at least some amount of slack or looseness exists between the filtration bag 44 and the cage 42. Another way of saying this is that the filtration bag 44 does not form-fit or press-fit against the cage 42 during the installation of the filtration bag onto the cage. Such looseness can help to provide ease of bag installation (e.g., the filtration bag does not bind during installation). In addition, such looseness can help avoid snagging, tearing, puncturing, or otherwise stressing of the filtration bag 44 during installation.

Once the cage 42 is fully inserted into the filtration bag 44 (i.e., the bag is pulled up to completely envelope the bag), the need for slack or looseness between the filtration bag 44 and the cage 42 no longer exists. The presence of lack or looseness between the filtration bag 44 and the cage 42 can actually be detrimental. It is possible that some bag movement relative to the cage might occur during operation. For example, during filtration flow, the filtration bag 44 may be forced against the cage 42 because of a fluid flow there through and the pressure differential associated with such flow. However, during a pulse cleaning cycle, the filtration bag 44 may try to move away from the cage. Movement of the filtration bag 44 may cause stresses, wear or the like. It may be beneficial to reduce or eliminate some filtration bag movement to help avoid stress, wear, etc.

Figure 7:
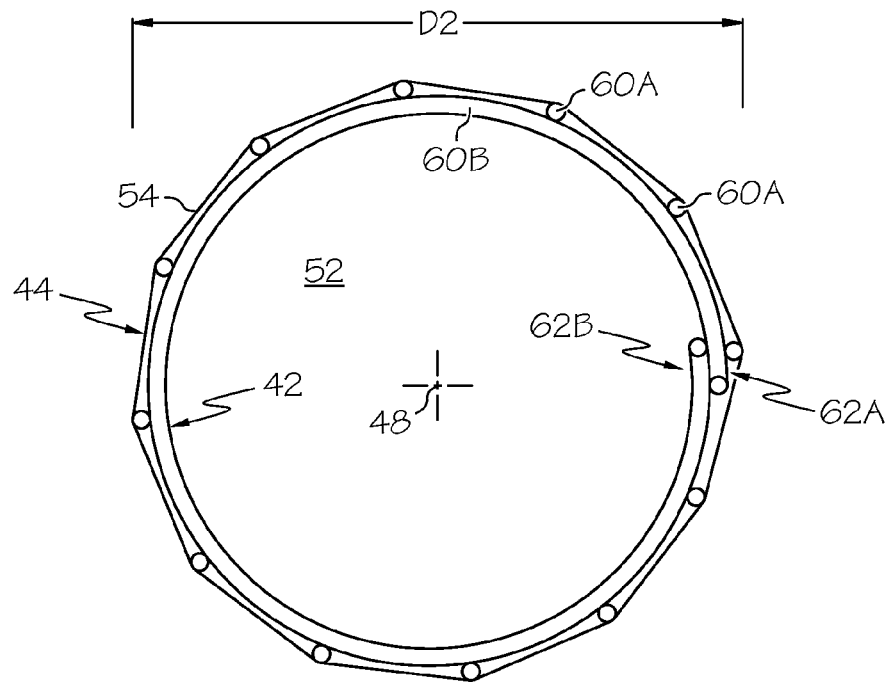
FIG. 7 is a view similar to FIG. 6, but with the cage inserted into the bag and with the cage diameter increased to force a bag sidewall taut against the cage.
Figure 8:
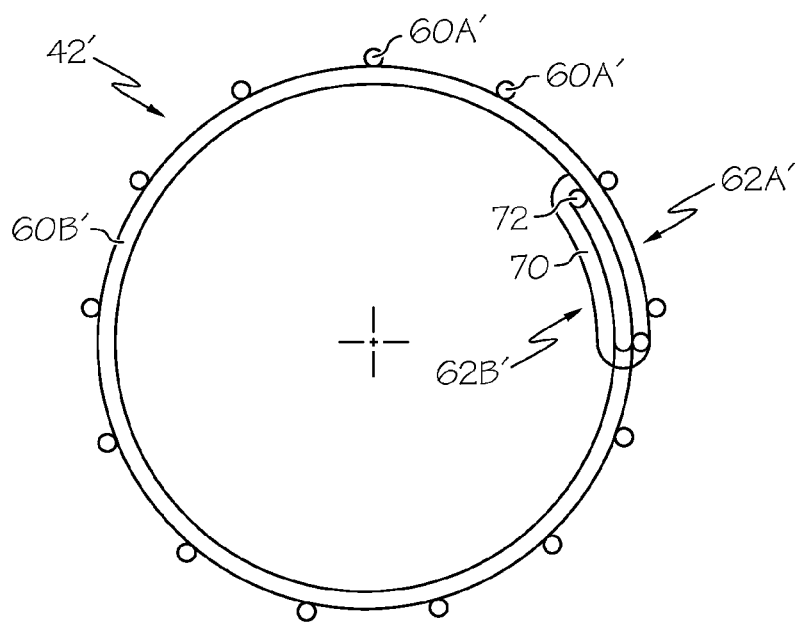
FIG. 8 is a schematic representation of another embodiment in a view similar to the view shown within FIG. 6, and shows portions that limit an amount of change in the cage cylindrical diameter.

Turning now to a comparison of FIGS. 6 and 7, it is to be appreciated that the first diameter D1 of the cage 42 pre-bag installation shown within FIG. 6 is less than a second, greater diameter D2 of the cage 42 post-bag installation shown in FIG. 7. It is to be recalled that the condition of the cage 42 shown in FIG. 6 is a rolled condition with a diameter D1 that permits easy of insertion of the cage 42 into the bag 44. The condition of the cage 42 shown in FIG. 7 shows the diameter D2 is increased (i.e., expanded) and the overlap of the two end portions 62A, 62B to be lessened.

Within the cage 42, which has the general cylindrical shape formed from a rolled flat of cage material with two disjoint ends extending parallel to the central axis 48, the two ends that are at the two end portions 62A, 62B move circumferentially about the axis 48 relative to each other during diametrical expansion of the cage. The amount of diameter increase is such that the diameter D2 of the cage is now effectively equal to an inner diameter of the encircling sidewall 54 of the filtration bag 44. As such, the sidewall 54 of the filtration bag 44 is forced taut against the cage 42. Such tautness helps prevent movement of the filtration bag 44 relative to the cage 42. Movement prevention is useful to help prevent undesirable bag movement (e.g., flexing folding/unfolding) and thus help prevent bag damage.

The increase in diameter (i.e., expansion) of the cage 42, as shown by the comparison of FIGS. 6 and 7, can be accomplished with some variety. It is to be appreciated that it is intended that the variations are within the scope of the present invention. It is to be recalled that within the shown example of FIGS. 2-7, at least the wire bars of the second group 60B (i.e., the wire bars that are curved/formed into arc that provide a general circular shape) are resilient. It is to be appreciated that the structure of the cage 42 having disjoint end portions 62A, 62B that can circumferentially move past each other is one example of cage structure that permits expansion of the cage to increase a cage cylindrical diameter that forces the bag sidewall taut against the cage. It is to be understood that different embodiments of the cage may have different cage structure that permits expansion of the cage to increase a cage cylindrical diameter that forces the bag sidewall taut against the cage. However, such other embodiments/structures are considered to be within the scope of the present invention.

Within one specific example, the resilience attribute also provides some level of elasticity that urges the cage 42 at least partially toward the initial flat state (see FIG. 2). The resilient elasticity can be considered to be "springiness" that urges toward the initial flat state. The resilient elasticity may not have sufficient resilience to return completely to the initial flat state. Nonetheless, the urging due to the resilience thus urges the cage 42 to spread toward a more open condition and thus have an increased diameter.

It should be noted that for the cage 42 which has resilient elasticity that urges toward a larger diameter (i.e., expanded) state, it may be convenient to force the cage into the relatively smaller diameter state and provide some sort of temporary retainer to help hold the cage in the relatively smaller diameter state during insertion of the cage into the bag. The temporary retainer could then be released once the cage 42 is inserted into the bag 44 and it is desirable to have the relatively larger diameter to force the bag sidewall 54 taut against the cage.

It should be appreciated that elastic resilience of the cage 42 that urges toward the larger diameter can be present and utilized beneficially during the installation. However, it should further be appreciated that such elastic resilience is not required to accomplish the expansion of the cage 42 to increase the cage cylindrical diameter that forces the bag sidewall 54 taut against the cage. It is possible that the cage 42 may not itself have sufficient elastic resilience. However, the cage 42 can nonetheless be forced (e.g., expanded, pushed or the like) to a larger diameter. Such forcing to a larger diameter can via the use of a tool or the like. Such a tool can be of varied form. Such a tool is not a limitation upon the present invention and thus is not presented herein. It is with resilience, possibly in the form of plastic deformation, of the cage 42 that the cage can accommodate the force that causes the increased cylinder diameter.

It is possible that the cage 42 will retain the larger diameter configuration without the aid of additional portions, devices, etc. However, it is similarly possible that some additional portions, devices, etc. can be utilized to help retain the cage 42 in the larger diameter configuration. For example, once the desired larger diameter configuration for the cage 42 is achieved and the bag 44 is taut against the cage, clips, fasteners, etc. can be connected between the two end portions of the cage to prevent relative movement back toward a smaller diameter configuration. Such clips, fasteners, etc. can be of varied forms. Such clips, fasteners, etc. are not limitations upon the present invention and thus are not presented herein.

In accordance with another aspect of the present invention, FIG. 7 shows a view of another embodiment that is similar to the view shown in FIG. 6. The difference of the embodiment shown in FIG. 7 is that the embodiment includes structure that limits diameter dimension change. Within FIG. 7, similar reference numeral are used to indicate similar structure, but with the addition of a "'" (prime) to indicate that some difference exists.

Within the shown example, at least some of the bars 62B' of the second group have looped end portions 70 adjacent one disjoint end of the cage 42'. An end one 72, the bar of the first group 60A' at the other disjoint end is entrapped within the looped end portions 70. The entrapped bar 72 is moveable within the looped end portions 70 during diameter dimension changes of the cage 42' with limitations of movement of the entrapped bar within the looped end portions corresponding to limitations of diameter dimension change of the cage. It is to be appreciated that other constructions/configurations for providing limitation of the movement are possible and are to be considered to be within the scope of the invention.

It is to be appreciated that although the presented examples provide cages that have a general cylindrical shape it is to be appreciated that the present invention can be utilized within other examples that have cages with different shapes. Some example shapes that could be present for the cages include, but are not limited to conical, truncated conical, and rectangular. The associated increase in diameter would accordingly be an increase in a diameter associated with the particular shape of the cage. The diameter that is increased need not be a specific limitation upon the present invention. As such, in general, the cross-sectional area of the cage is thus increased.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A filter for use in a baghouse for filtering at least some particulate material from fluid, the filter to be supported by a tubesheet separating dirty fluid and clean fluid chambers of the baghouse, the filter including:
- a filtration bag having an open end adjacent to the tubesheet and an encircling sidewall extending from the open end to a distal end along a direction of a central axis of the filtration bag, the bag sidewall permitting passage of fluid there through so that the fluid may pass from the dirty fluid chamber to the clean fluid chamber and blocking passage of at least some particulate material against proceeding to the clean fluid chamber; and
- a cage located within the filtration bag, the cage having structure to permit expansion of the cage to increase a cage diameter that forces the bag sidewall taut against the cage;
- wherein the shape of the cage is a general cylindrical shape, the increase in cage diameter is an increase in cage cylindrical diameter, and the cage has a side that extends in a helix with one portion located radially inward of another portion.

2. A filter as set forth in claim 1, wherein the side of cage is made from a sheet-like member rolled into the general cylindrical shape.

3. A filter as set forth in claim 2, wherein the side of cage is made resilient material that can move at least partially toward a sheet-like condition too increase the cage cylindrical diameter.

4. A filter as set forth in claim 3, wherein the cage is wire-formed with wires extending parallel to the axis and curved wires extending in an arc about the axis, the curved wires being curved during the rolling to provide the general cylindrical shape, the curved wires having resiliency to move toward an un-curved condition.

5. A filter as set forth in claim 3, wherein the cage has portions that limit an amount of movement toward the sheet-like condition to limit the amount of change in the cage cylindrical diameter.

6. A filter as set forth in claim 5, wherein the cage is wire-formed with wires extending parallel to the axis and curved wires extending in an arc about the axis, the curved wires being curved during the rolling to provide the general cylindrical shape, the curved wires having resiliency to move toward an un-curved condition, and a portion of the curved wires being hooked to provide the portions that limit an amount of movement toward the sheet-like condition.

7. A filter as set forth in claim 1, wherein the shape of the cage is a general cylindrical shape, the increase in cage diameter is an increase in cage cylindrical diameter, and the cage has two end side edges, the side edges are moved relative to each other during the increase in cage cylindrical diameter.

8. A filter as set forth in claim 1, wherein the shape of the cage is a general cylindrical shape, the increase in cage diameter is an increase in cage cylindrical diameter, and the cage has the general cylinder shape formed from a rolled flat of cage material with two disjoint ends extending parallel to the central axis, the two ends moving circumferentially about the axis relative to each other during diametrical expansion of the cage.

9. A filter as set forth in claim 8, wherein the cage includes:
- a first group of bars extending parallel to the central axis, with a bar of the first group being located at each disjoint end; and
- a second group of bars extending traverse to the bars of the first group and extending about the central axis, and secured to the first group of bars at intersections between the first and second groups of bars.

10. A filter as set forth in claim 9, wherein the at least the second group of bars is made of resilient material that allows elastic deformation associated diameter dimension changes of the cage.

11. A filter as set forth in claim 10, wherein the resilient material is metal.

12. A filter as set forth in claim 10, wherein at least some of the bars of the second group have looped end portions adjacent one disjoint end of the cage, a bar of the first group at the other disjoint end being entrapped within the looped end portions, the entrapped bar being moveable within the looped end portions during diameter dimension changes of the cage with limitations of movement of the entrapped bar within the looped end portions corresponding to limitations of diameter dimension change of the cage.

13. A baghouse filter assembly for filtering at least some particulate material from fluid, the arrangement including:
- a housing including a dirty fluid chamber and a clean fluid chamber separated by a tubesheet, the tubesheet having at least one aperture there through; and
- a filter supported by the tubesheet, the filter including:
  - a filtration bag having an open end adjacent to the tubesheet and an encircling sidewall extending from the open end to a distal end along a direction of a central axis of the filtration bag, the bag sidewall permitting passage of fluid there through so that the fluid may pass from the dirty fluid chamber to the clean fluid chamber and blocking passage of at least some particulate material against proceeding to the clean fluid chamber; and
  - a cage located within the filtration bag, the cage having structure to permit expansion of the cage to increase a cage diameter that forces the bag sidewall taut against the cage;
  - wherein the shape of the cage is a general cylindrical shape, the increase in cage diameter is an increase in cage cylindrical diameter, and the cage has a side that extends in a helix with one portion located radially inward of another portion.

14. A baghouse filter assembly as set forth in claim 13, wherein the side of cage is made from a sheet-like member rolled into the general cylindrical shape.

15. A baghouse filter assembly as set forth in claim 13, wherein the shape of the cage is a general cylindrical shape, the increase in cage diameter is an increase in cage cylindrical diameter, and the cage has two end side edges, the side edges are relatively moved during the increase in cage cylindrical diameter.

16. A baghouse filter assembly as set forth in claim 13, wherein the shape of the cage is a general cylindrical shape, the increase in cage diameter is an increase in cage cylindrical diameter, and the cage has the general cylinder shape formed from a rolled flat of cage material with two disjoint ends extending parallel to the central axis, the two ends moving circumferentially about the axis relative to each other during diametrical expansion of the cage.

17. A baghouse filter assembly as set forth in claim 16, wherein the cage includes:
- a first group of bars extending parallel to the central axis, with a bar of the first group being located at each disjoint end; and
- a second group of bars extending traverse to the bars of the first group and extending about the central axis, and secured to the first group of bars at intersections between the first and second groups of bars.

18. A baghouse filter assembly as set forth in claim 17, wherein the at least the second group of bars is made of resilient material that allows elastic deformation associated diameter dimension changes of the cage.

* * * * *